US009171674B2

(12) United States Patent
Casasanta (10) Patent No.: US 9,171,674 B2
(45) Date of Patent: Oct. 27, 2015

(54) IONIC ELECTRON CONDUCTIVE POLYMER CAPACITOR

(75) Inventor: Vincenzo Casasanta, Woodinville, WA (US)

(73) Assignee: Empire Technology Development LLC, Wilmington, DE (US)

( * ) Notice: Subject to any disclaimer, the term of this patent is extended or adjusted under 35 U.S.C. 154(b) by 766 days.

(21) Appl. No.: 13/260,234

(22) PCT Filed: Apr. 6, 2011

(86) PCT No.: PCT/US2011/031329
§ 371 (c)(1),
(2), (4) Date: Mar. 30, 2012

(87) PCT Pub. No.: WO2012/138330
PCT Pub. Date: Oct. 11, 2012

(65) Prior Publication Data
US 2012/0256600 A1    Oct. 11, 2012

(51) Int. Cl.
*H01G 9/00*     (2006.01)
*H01G 9/022*   (2006.01)
*H01G 11/54*   (2013.01)
*B82Y 30/00*    (2011.01)

(52) U.S. Cl.
CPC ............... *H01G 9/038* (2013.01); *B82Y 30/00* (2013.01); *H01G 11/54* (2013.01); *Y02E 60/13* (2013.01)

(58) Field of Classification Search
USPC ......... 361/502, 503–504, 509–512, 516–519, 361/523–525, 528–529
See application file for complete search history.

(56) References Cited

U.S. PATENT DOCUMENTS

| | | | |
|---|---|---|---|
| 5,800,857 A | | 9/1998 | Ahmad et al. |
| 5,843,592 A | * | 12/1998 | Barker et al. ................... 429/50 |
| 6,510,042 B1 | | 1/2003 | Lee et al. |
| 2002/0089807 A1 | | 7/2002 | Bluvstein et al. |

(Continued)

OTHER PUBLICATIONS

G. Snook et al., Conducting-polymer-based supercapacitor devices and electrodes CSIRO Process Science and Engineering, Box 312, Clayton South, Victoria 3169, Australia; CSIRO Energy Technology, Box 312, Clayton South, Victoria 3169, Australia, Journal of Power Sources journal homepage: www.elsevier.com/locate/jpowsour.

(Continued)

*Primary Examiner* — Nguyen T Ha
(74) *Attorney, Agent, or Firm* — Turk IP Law, LLC (57) ABSTRACT

Technologies are generally described for an electron conductive polymer capacitor may incorporate a conductive polymer mixture embedded with carbon nanoparticles between electrodes to rapidly charge and store large amounts of charge compared to conventional electrolytic capacitors. Such a capacitor may be constructed with a laminate sheet including layers of inner and outer electrodes, an electrolyte mixture between the electrodes, a conductive polymer mixture, and a composite mixture of carbon nanoparticles embedded in the conductive polymer between the inner electrodes. The laminate sheet may be wound into a roll and the inner and outer electrodes are coupled electrically. When an electric field is applied, cations within the electrolyte mixture move towards the outer electrodes and anions towards the inner electrodes. Further, the inner conductive polymer layer is ionized causing electrons to move toward the inner electrodes to be deposited onto high surface area carbon nanoparticles where charge is stored.

12 Claims, 7 Drawing Sheets

(56) References Cited

U.S. PATENT DOCUMENTS

2008/0316679 A1* 12/2008 Sugihara et al. .............. 361/504
2010/0055572 A1 3/2010 Park et al.

OTHER PUBLICATIONS

C. Meng et al., Highly Flexible and All-Solid-State Paperlike Polymer Supercapacitors Nanotechnology Research Center and Department of Physics, Tsinghua University, Beijing 100084, People's Republic of China. pubs.acs.org/NanoLett.

Q. Liu et al., Supercapacitor electrodes based on polyaniline-silicon nanoparticle composite, Journal of Power Sources, journal homepage: www.elsevier.com/locate/jpowsour.
International Search Report and Written Opinion for PCT/US2011/031329 mailed Jul. 26, 2011.
International Preliminary Report on Patentability, PCT/US2011/031329, mailed Oct. 8, 2013.
Hughes, M., "Carbon Nanotube-Conducting Polymer Composites in Supercapacitors," Dekker Encyclopedia of Nanoscience and Nanotechnology, Second Edition, pp. 12 (Mar. 24, 2009).
Simon, P., and Gogotsi, Y., "Materials for electrochemical capacitors," Nature Materials, vol. 7, pp. 845-854 (Nov. 2008).

* cited by examiner

IONIC ELECTRON CONDUCTIVE POLYMER CAPACITOR

CROSS REFERENCE TO RELATED APPLICATIONS

This Application is the National Stage filing under 35 U.S.C. §371 of PCT Application Ser. No. PCT/US11/31329 filed on Apr. 6, 2011. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Electrical double layer capacitors (EDLCs) are commonly used to store large charge densities for high rate power extraction in place of batteries and other types of capacitors. In this technology, charge is stored at the interface of high porosity carbon particles and the electrochemical double layer of an electrolyte. This is accomplished by polarizing the capacitor in one bias direction for storage and discharging in the opposite direction for power recapture. High power extraction rates are possible using EDLCs in comparison to other capacitor types due to the accumulation of charge on the porous carbon particles. Some electrochemical capacitors operate using reduction/oxidation (redox) reactions for charge transfer, called pseudo-capacitance. EDLCs are commonly used in place of basic electrolytic capacitors and batteries because of their high energy density and high power extraction rates in technologies such as energy systems, hybrid cars and railway systems within the transportation industry. As EDLCs become more useful in commercial technology, where fast charging and high energy storage is necessary, a capacitor structure that can store a maximum amount of charge and can rapidly charge and discharge is desirable.

The present disclosure appreciates that there are several limitations with known electrochemical capacitors. The use of porous carbon particles or charcoal in a typical EDLC for storage of charge limits the maximum amount of energy density, charge storage, and power extraction.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

The present disclosure generally describes a double layer electrochemical capacitor. An example double layer electrochemical capacitor may include two inner electrodes and two outer electrodes, where an electrolyte mixture is deposited between the outer and inner electrodes. The example electrochemical capacitor may also include a conductive polymer layer deposited between the outer electrodes, where electrons are mobile when an electric field is applied between each of the outer and inner electrodes. The electrochemical capacitor may further include a composite material of carbon nanoparticles embedded in the conductive polymer layer, where the composite material is deposited along the inside surfaces of each of the inner electrodes between the inner electrode and the conductive polymer layer.

The present disclosure also describes methods for constructing electrochemical capacitors. In other examples, a method of constructing an electrochemical capacitor may include compounding an electrolyte mixture of an ionically conducting polymer, a propylene carbonate, and one of an ionic salt or ionic mixture. The method of constructing the electrochemical capacitor may also include compounding a conductive polymer and compounding carbon nanoparticles with a portion of the conductive polymer to create a carbon nanoparticle-conductive polymer (CNP/CP) layer. The method of constructing the electrochemical capacitor may further include creating a laminate sheet, where the laminate sheet is made up of two inner and two outer electrodes, the electrolyte mixture, the conductive polymer mixture, and the CNP/CP layer. The method of constructing the electrochemical capacitor may further include winding the laminate sheet into a roll and coupling the inner electrodes together electrically and the outer electrodes together electrically.

The present disclosure further describes a method for rapidly charging an electrochemical capacitor. The method for rapidly charging the electrochemical capacitor may include applying a direct current bias to the two sets of inner and outer electrodes, where the electrically coupled outer electrodes are negatively charged and the electrically coupled inner electrodes are positively charged. The method for rapidly charging the electrochemical capacitor may also include, through an electrical field created by the applied direct current bias, causing cations within the electrolyte mixture deposited between the outer electrodes and the inner electrodes to move toward the outer electrodes and anions within the electrolyte mixture to move toward the inner electrodes. The method for rapidly charging the electrochemical capacitor may further include oxidizing the inner conductive polymer layer deposited between the inner electrodes, and causing electrons within the conductive polymer to drift toward the inner electrodes.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged in accordance with at least some embodiments as described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure is generally drawn, inter alia, to compositions, methods, apparatus, systems, devices, and/or computer program products related to manufacturing and using an electron conductive polymer capacitor, for storing large charge densities and rapidly charging and discharging for high rate power extraction.

Briefly stated, an electron conductive polymer capacitor may incorporate a conductive polymer mixture embedded with carbon nanoparticles between electrodes to rapidly charge and store large amounts of charge compared to conventional electrolytic capacitors. Such a capacitor may be constructed with a laminate sheet including layers of inner and outer electrodes, an electrolyte mixture between the inner and outer electrodes, a conductive polymer mixture, and a composite mixture of carbon nanoparticles embedded in the conductive polymer between the inner electrodes. The laminate sheet may be wound into a roll and the inner and outer electrodes are coupled electrically. When an electric field is applied, cations within the electrolyte mixture move towards the outer electrodes and anions towards the inner electrodes. Further, the inner conductive polymer layer is ionized or oxidized causing electrons to move toward the inner electrodes to be deposited onto high surface area carbon nanoparticles where charge is stored.

Figure 1:
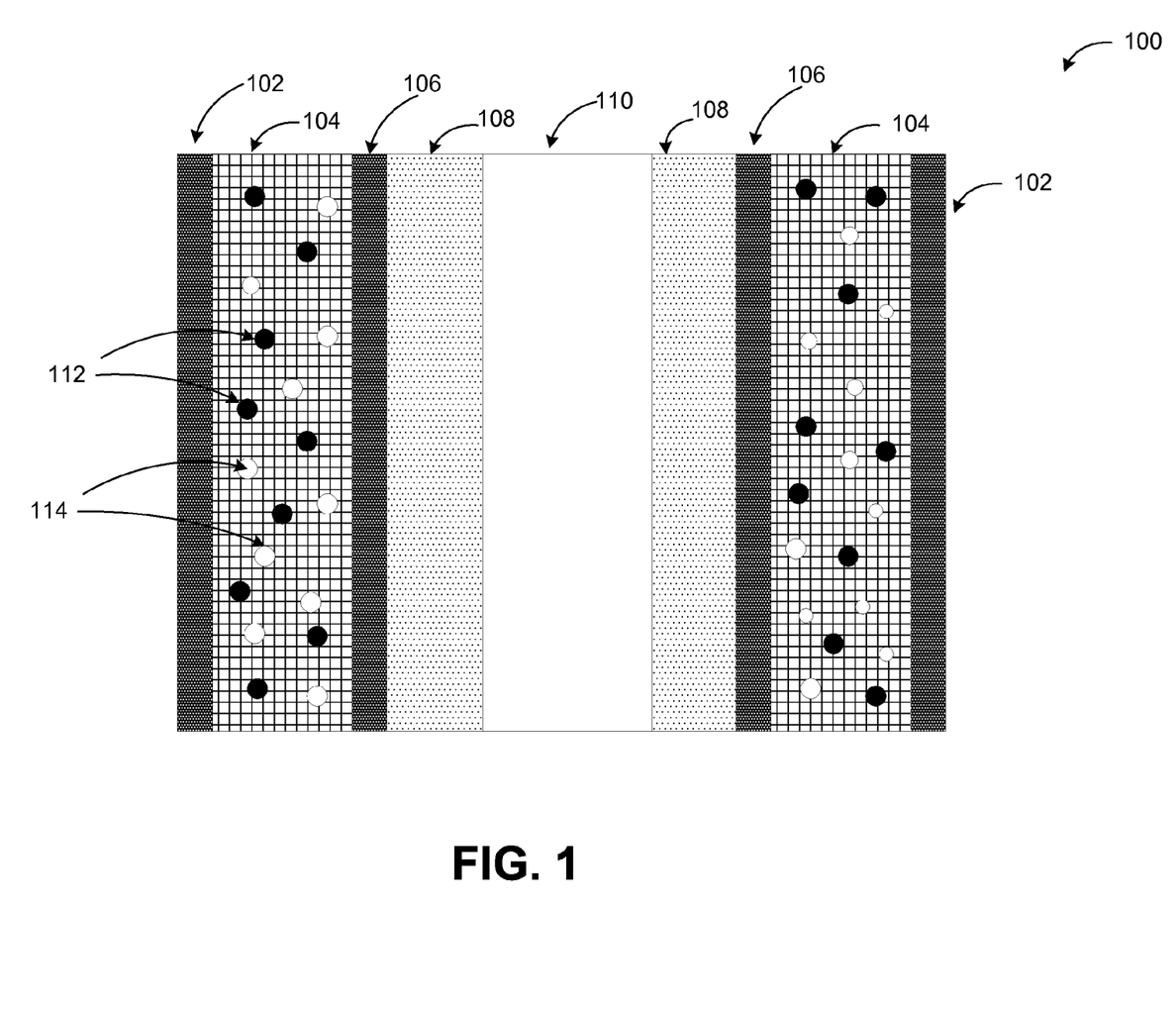
FIG. 1 illustrates an electron conductive polymer capacitor.

FIG. 1 illustrates an electron conductive polymer capacitor device (the capacitor), arranged in accordance with at least some embodiments described herein. As illustrated in diagram 100, the electron conductive polymer capacitor may be constructed as a laminate sheet with layers of outer electrodes 102, an electrolyte mixture 104, inner electrodes 106, a conductive polymer mixture 110 and a composite mixture 108 of carbon nanoparticles embedded in a conductive polymer (CNP/CP).

Diagram 100 demonstrates the laminate electron conductive polymer capacitor in an uncharged state before a DC bias is connected and an electric field is applied across the capacitor. According to some embodiments, the capacitor may include two pairs of electrodes: a pair of outer electrodes 102 and a pair of inner electrodes 106. The electrodes may be composed of a metallic material such as aluminum, tantalum, titanium or similar metal or metal alloy, and have a thickness varying in a range from about 10 microns to about 50 microns. The pair of outer electrodes 102 are coupled together electrically, and the pair of inner electrodes 106 are coupled together electrically. In a charging mode, an electric field may be applied to the capacitor such that the outer electrodes 102 are negatively charged and the inner electrodes 106 are positively charged. In a further embodiment, the surfaces of the electrodes may be texturized so as to increase the area for accumulating charge. The surfaces may be texturized using various techniques such as chemical or plasma etching in order to produce pores on the surface of the electrodes with a pore diameter varying in a range from about 1 nanometer to about 999 nanometers.

As further demonstrated in diagram 100, an electrolyte mixture 104 may be deposited between each inner electrode 106 and corresponding outer electrode 102. The electrolyte mixture 104 may be effective to form a layer (when cured or otherwise solidified) between the electrodes having a thickness in a range from about 1 micron to about 100 microns. The electrolyte mixture 104 may be deposited between the inner and outer electrodes in a liquid state and may be treated to form a solid state electrolyte layer between the inner and outer electrodes 102, 106. According to some embodiments, the electrolyte mixture 104 may include an ionically conducting polymer, a propylene carbonate, and an ionic salt or ionic mixture. The ionically conducting polymer may be, for example, a polyethylene oxide having a molecular rate in a range from about $10^5$ to about $10^7$. The ionic salt or ionic salt mixture may include one or more types of cations 112 and one or more types of anions 114, where the cations may be $Li^+$, $Na^+$, $NH_4^+$, or $NR_4^+$, and the anions may be $ClO_4^-$, $RSO_3^-$, or $BF_4^-$, with R representing a hydrocarbon in both cases. According to other embodiments, the concentration of the salt or salt mixture in the electrolyte may be matched to a maximum electron output or a possible number of electron charge carriers in the conductive polymer layer in order to achieve maximum charging capacity. As demonstrated in diagram 100, in an uncharged state, the cations 112 and anions 114 of the polymer electrolyte mixture may be randomly distributed thought the electrolyte layer.

A conductive polymer or semiconductive polymer layer (CP layer) 110 may be deposited between the two inner electrodes 106 as the center layer of the laminate sheet. The conductive polymer layer 110 may have a thickness varying in range from about 1 micron to about 100 microns. The conductive polymer layer 110 may provide for the ionization of atoms such that electrons may be made mobile when an electric field is generated across the capacitor due to an applied voltage. According to some embodiments, the conductive polymer may be composed of one or more polymers from the groups of polyanilines, polythiophenes, polypyrroles, polypyridines, polycarbazoles, polyindoles, polyazepines, and/or polyphenylene sulfide. As demonstrated in diagram 100, in an uncharged state, the conductive polymer layer 110 is in a neutral ionizable state.

Carbon nanoparticles may be embedded into the conductive polymer layer 110 to form a carbon nanoparticles-conductive polymer (CNP/CP) layer 108 along the inner surfaces of each inner electrode 106. The carbon nanoparticles, which may be embedded into the conductive polymer layer 110, may have an average diameter in a range from about 10 nanometers to about 100 nanometers. The carbon nanoparticles may be dispersed throughout the CNP/CP layers 108 effective to provide a large surface area for collecting and storing large amounts of electronic charge relative to conventional electrolytic capacitors. The CNP/CP layer 108 may have a thickness varying in a range from about 1 micron to about 100 microns. In an uncharged state, the carbon nanoparticles may be in a neutral state, with minimal electric charge on the surfaces.

Figure 2:
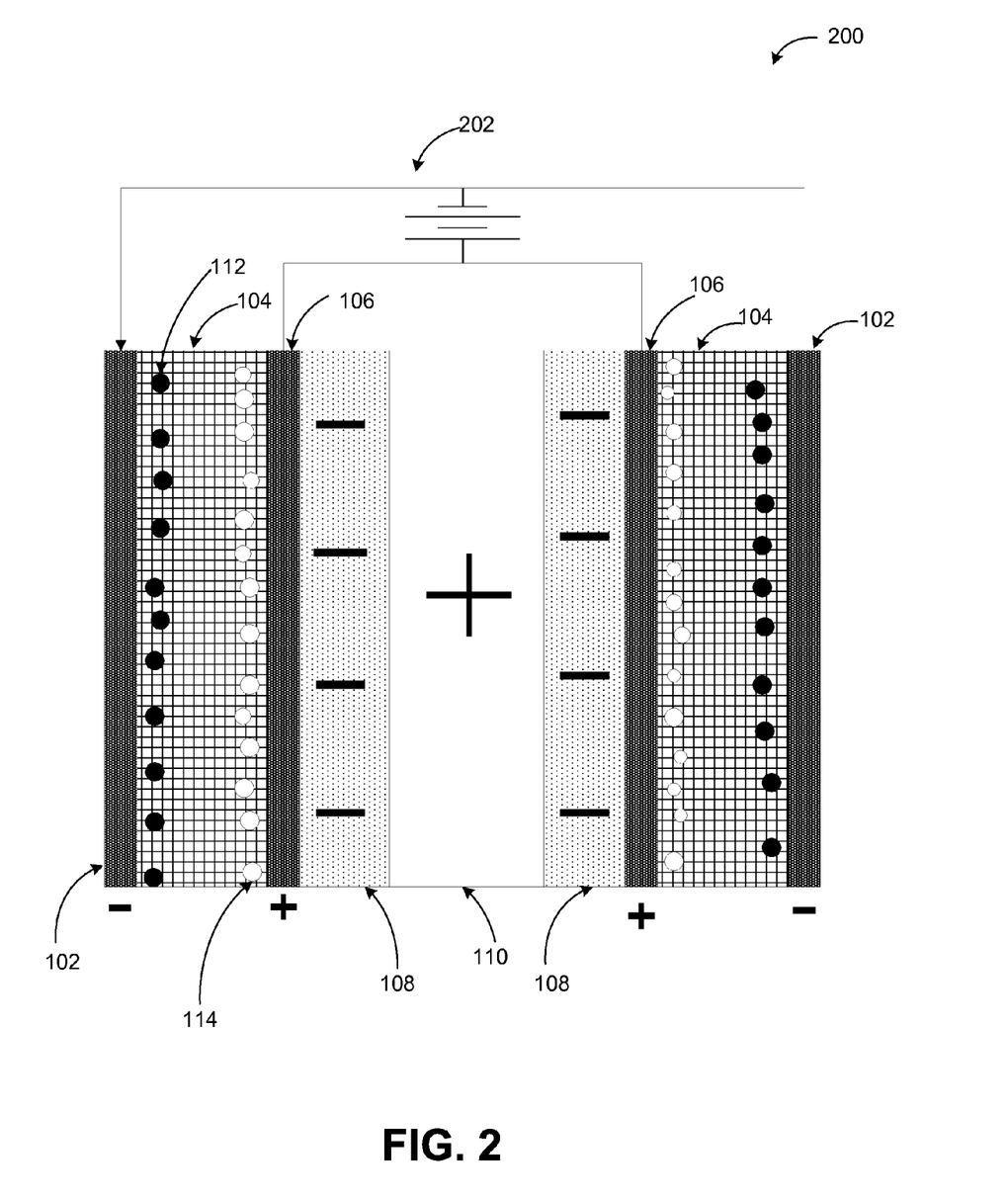
FIG. 2 illustrates an electron conductive polymer capacitor in a charged state.

FIG. 2 illustrates an electron conductive polymer capacitor configured in a charging state, in accordance with at least some embodiments described herein. In diagram 200, a capacitor is shown with a direct current bias 202 applied to the electrodes generating an electrical field across the capacitor resulting in charging of the capacitor. The outer electrodes 102 are coupled together and the inner electrodes 106 are coupled together as mentioned previously. A direct current bias 202 may be applied to the two sets of inner electrodes 106 and outer electrodes 102 such that the electrically coupled outer electrodes 102 are negatively charged and the electrically coupled inner electrodes 106 are positively charged. With the direct current bias 202 across the electrodes of the capacitor, the cations 112 and anions 114 within the electrolyte layer 104 may be attracted towards the electrodes. The cations 112 may effectively accumulate on the negatively charged outer electrodes 102 and the anions 114 may effectively accumulate on the positively charged inner electrodes 106.

In addition to the movement of cations and anions between the corresponding inner and outer electrode pairs, the conductive polymer layer 110 may be ionized due to the applied electric field, liberating electron carriers in the conductive polymer. The voltage for generating the electric field to ionize the conductive polymer is $eV = I_c - \Phi m$ where $I_c$ is the ionization energy of the polymer and $\Phi m$ is the work function of the adjacent electrodes. For aluminum electrodes and most conductive polymers the voltage may be above 2V. A resulting electric double layer then forms at all interfaces due to the ionization of the conductive polymer. As the liberated electrons within the conductive polymer material flow from the conductive polymer layer towards the inner electrodes 106, the electrons may become attached to the porous surfaces of the carbon nanoparticles of the CNP/CP layer 108, resulting in a net negative charge within the CNP/CP layer 108 and a net positive charge in the inner conductive polymer layer 110. When the direct current bias 202 is decoupled from the capacitor, a substantial portion of the electronic charge may remain on the carbon nanoparticles as a form of stored energy.

An achievable energy density for an example scenario may be estimated as follows. The volume of the conductive polymer layer may be 1 cm$^3$ and may be capable of generating $10^{18}/cm^3$-$10^{19}/cm^3$ mobile electrons upon ionization due to the applied electric field. These mobile electrons then accumulate on the porous surfaces of the carbon nanoparticles and represent about 1 Coulomb/cm$^3$ (1 C=6.24 $10^{18}$ e$^-$). Energy=½ QV and the applied voltage brings the capacitor to a potential of 4 V. The energy associated with this charging is ½QV=½ 1 C·4 V=2 J. Assuming the volume of the electrolyte polymer is 1 cm$^3$ and the volume of the electrodes is negligible, the total volume is 2 cm$^3$ and the total energy density is 2 J/2 cm$^3$=1 J/cm$^3$.

Figure 3:
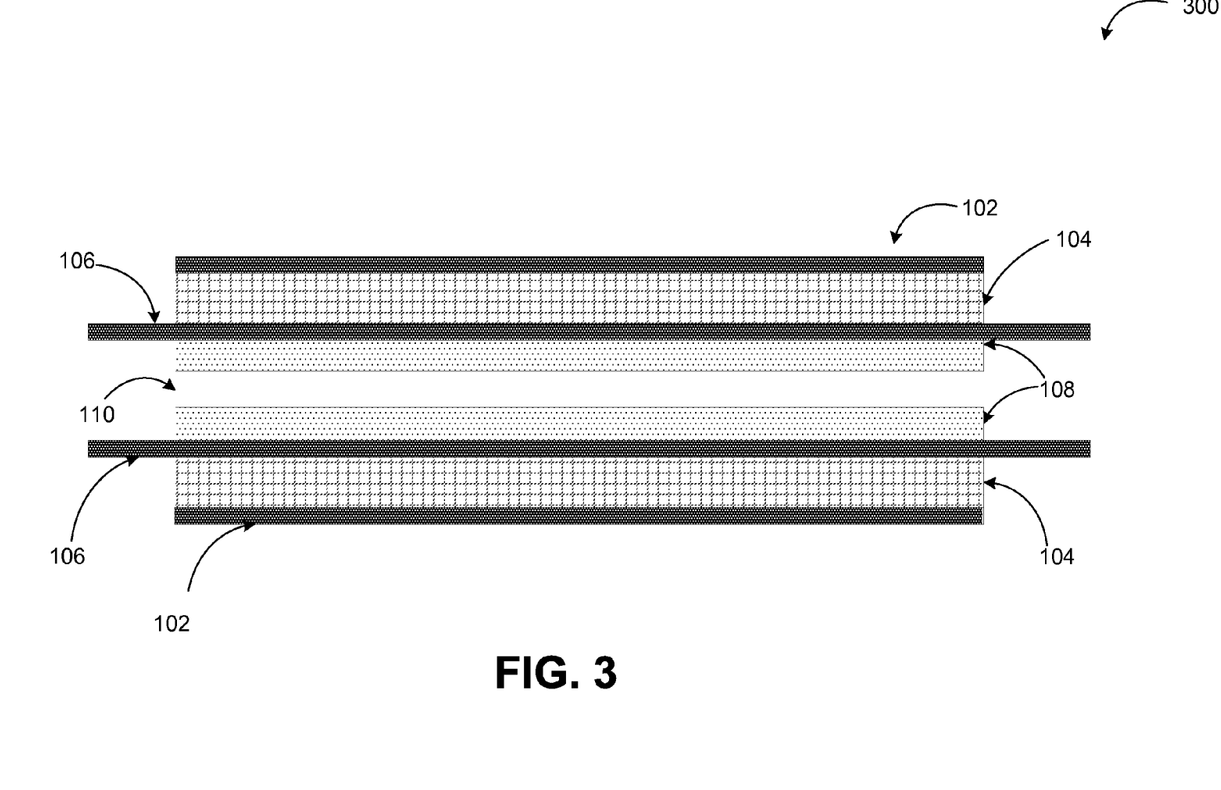
FIG. 3 illustrates a sectional view of an electron conductive polymer capacitor.

FIG. 3 illustrates a sectional view of an electron conductive polymer capacitor, in accordance with at least some embodiments described herein. The cross sectional view in diagram 300 illustrates a configuration of the electron conductive polymer capacitor as a laminate sheet arranged according to some embodiments. According to other embodiments, the capacitor may be constructed using rigid materials (e.g., electrodes) instead of a laminate sheet. In the illustrated example configuration, the electron conductive polymer capacitor may be fabricated as a laminate sheet comprising layers of two inner electrodes 106, two outer electrodes 102, an electrolyte layer 104, a conductive polymer layer 110, and a CNP/CP layer 108. The laminate sheet may be wound into a cylindrical roll, and the inner electrodes 106 are coupled together electrically and the outer electrodes 102 are coupled together electrically. The laminate sheet may be assembled utilizing an industrial lamination process including a doctor-blading technique combined with calendaring each layer together in a roll-to-roll process. An electrolyte mixture, a conductive polymer mixture, and the CNP/CP mixture may initially be compounded before assembling the layers of the laminate sheet according to embodiments.

The electrolyte mixture may be compounded by mixing an ionically conducting polymer, a propylene carbonate, and one of an ionic salt or ionic mixture. The electrolyte mixture may be compounded in an aprotic solvent, for example, gamma-butyrolactone or cyclopentanone, reaching a viscosity in a range from about 50 to about 500 centipoise. According to other embodiments, the concentration of the ionic salt or ionic salt mixture in the electrolyte mixture may be set to optimally match a maximum potential electric charge as contained in the conductive polymer mixture in order to achieve a maximum storage capacity. In some implementations, the ionic salt or ionic salt mixture may be composed of one or more cations, such a Li$^+$, Na$^+$, NH$_4$, and NR$_4^+$, where R represents a hydrocarbon, and at least one anion such as ClO$_4^-$, RSO$_3^-$, and BF$_4^-$, where R represents a hydrocarbon.

The materials for the conductive polymer mixture may be compounded by mixing one or more polymers from the groups of polythiophenes, polypyrroles, polypyridines, polycarbazoles, polyindoles, polyazepines, and polyphenylene sulfide. According to further embodiments, the polymers may be mixed together in an aprotic solvent to a viscosity in a range from about 50 to about 500 centipoise. A carbon nanoparticle-conductive polymer mixture may be compounded by embedding carbon nanoparticles with an average diameter in a range from about 10 to about 100 nanometers within a portion of the conductive polymer mixture. In yet another embodiment, the inner surfaces of the electrodes 102, 106 may be texturized to produce pores varying in size from about 1 nanometer to about 999 nanometers in order to further increase the surface area for collecting the cations and anions of the electrolyte mixture.

According to some embodiments, the laminate sheet may be assembled by spreading one of the two outer electrodes 102 onto a roller and then spreading a layer of the electrolyte mixture 104 onto the surface of the first outer electrode using a doctor-blading technique. A first of the two inner electrodes 106 may be spread onto a roller and the first inner electrode 106 may be calendered with the electrolyte mixture coated outer electrode to join them together, resulting in a thin laminate film with an electrolyte layer 104 sandwiched by the two electrodes. The first thin laminate film may be heated to a specified temperature in order to remove any solvents for mechanical stability. The specified temperature may be any appropriate temperature that may be in a range from about 50 deg C to about 100 deg C. According to other embodiments, after baking the first laminate film, the inner electrode 106 may be coated with the CNP/CP layer 108 using a doctor blading procedure, and the film may be heated again for mechanical stability. A doctor blading procedure for blade for coating or spreading a thin layer of a material onto a surface by continuously moving a flat flexible blade over the surface to distribute the substance and remove any excess material. The conductive polymer mixture may then be spread onto the surface of the CNP/CP layer 108 using a doctor blading procedure, and the laminate film may be heated again. The laminate sheet may be further assembled by spreading a second layer of the carbon nanoparticle-conductive polymer mixture onto the conductive polymer layer 110, and then calendering the second of the two inner electrodes 106 to the carbon nanoparticle-conductive polymer mixture layer of the assembled laminate film and baking. Finally a second layer of the electrolyte mixture may be spread onto the surface of the second inner electrode on the laminate film, and then the second of the two outer electrodes 102 may be calendered with the electrolyte coated inner electrode of the assembled laminate film. The laminate film may be heated a final time resulting in a complete laminate film electron conductive polymer capacitor consisting of a first outer electrode, a first electrolyte layer, a first inner electrode, a first CNP/CP layer, a center conductive polymer layer, a second CNP/CP layer, a second inner electrode, a second electrolyte layer, and a second outer electrode.

According to some embodiments, the electrolyte layers may have a thickness varying in a range from about 1 micron to about 100 microns. The CNP/CP layers and the conductive polymer center layer may have a thickness varying in a range from about 1 micron to about 100 microns. The inner and outer electrodes may have a thickness varying in a range from about 10 microns to about 50 microns. Embodiments are not limited to these ranges, however, and an ionic electron conductive polymer capacitor may be implemented with layer of other thicknesses using the principles described herein. After complete assembly of the laminate film electron conductive polymer capacitor, the laminate sheet may be wound into a cylindrical roll and the inner electrodes are coupled together electrically and the outer electrodes are coupled together electrically.

Figure 4:
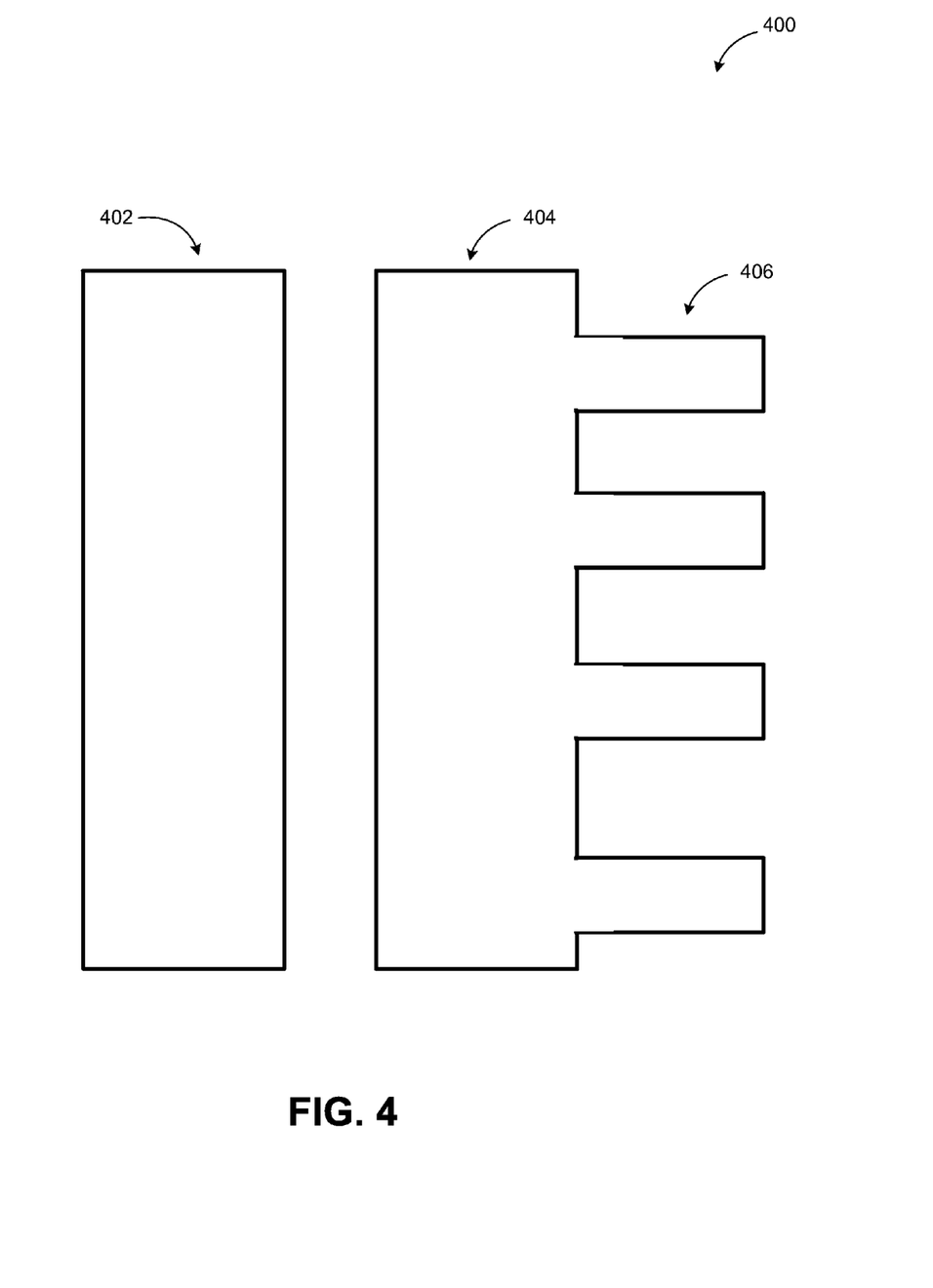
FIG. 4 illustrates an example plan view of laminate electrodes that may be used to form an electron conductive polymer capacitor.

FIG. 4 illustrates an example plan view of laminate electrodes that may be used to form an electron conductive polymer capacitor, arranged in accordance with at least some embodiments described herein. The plan view of diagram 400 demonstrates an example coupling of the inner electrodes 404 together and the outer electrodes 402 together. The outer electrodes 402 may be brought into contact with each other for electrical coupling during successive windings as the laminate sheet is wound into a roll. According to some embodiments, one or more extended tabs 406 may be formed on the inner electrodes 404 that may extend beyond the edges of the roll. The inner electrodes may be brought into contact with each other for electrically coupling by attaching the extended tabs 406 of the inner electrodes 404 together.

Example embodiments may also include methods of making electron conductive polymer capacitor as described herein. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
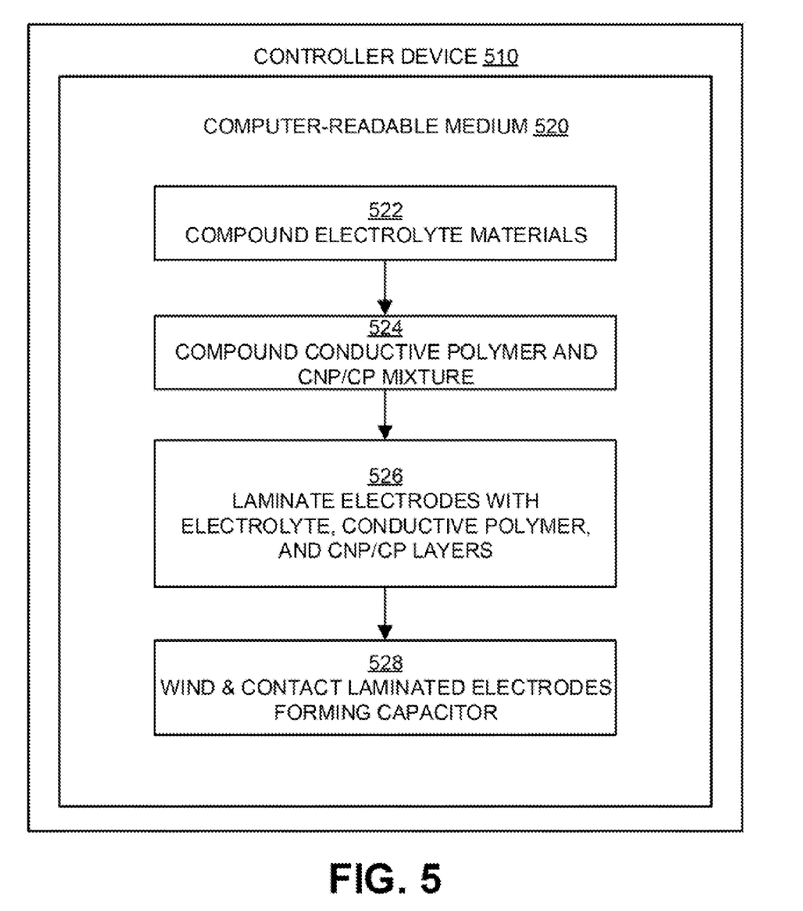
FIG. 5 is a flow diagram showing steps that may be used in making an example electron conductive polymer capacitor as disclosed herein.

FIG. 5 is a flow diagram illustrating operations that may be used in making an example electron conductive polymer capacitor, in accordance with at least some embodiments described herein. In various examples, a method of making an electron conductive polymer capacitor may include compounding multiple mixtures, including an electrolyte mixture, a conductive polymer mixture, and a composite material of carbon nanoparticles embedded in the conductive polymer (the carbon nanoparticle-conductive polymer mixture). The method of making an electron conductive polymer capacitor may further include creating a layered laminate sheet by layering the electrolyte mixture, conductive polymer mixture and carbon nanoparticle-conductive polymer mixture with the electrodes. After the layered laminate sheet has been assembled, the laminate sheet may be wound into a roll to form a cylindrical electron conductive polymer capacitor and the outer electrodes are coupled together and the inner electrodes are coupled together.

Figure 6:
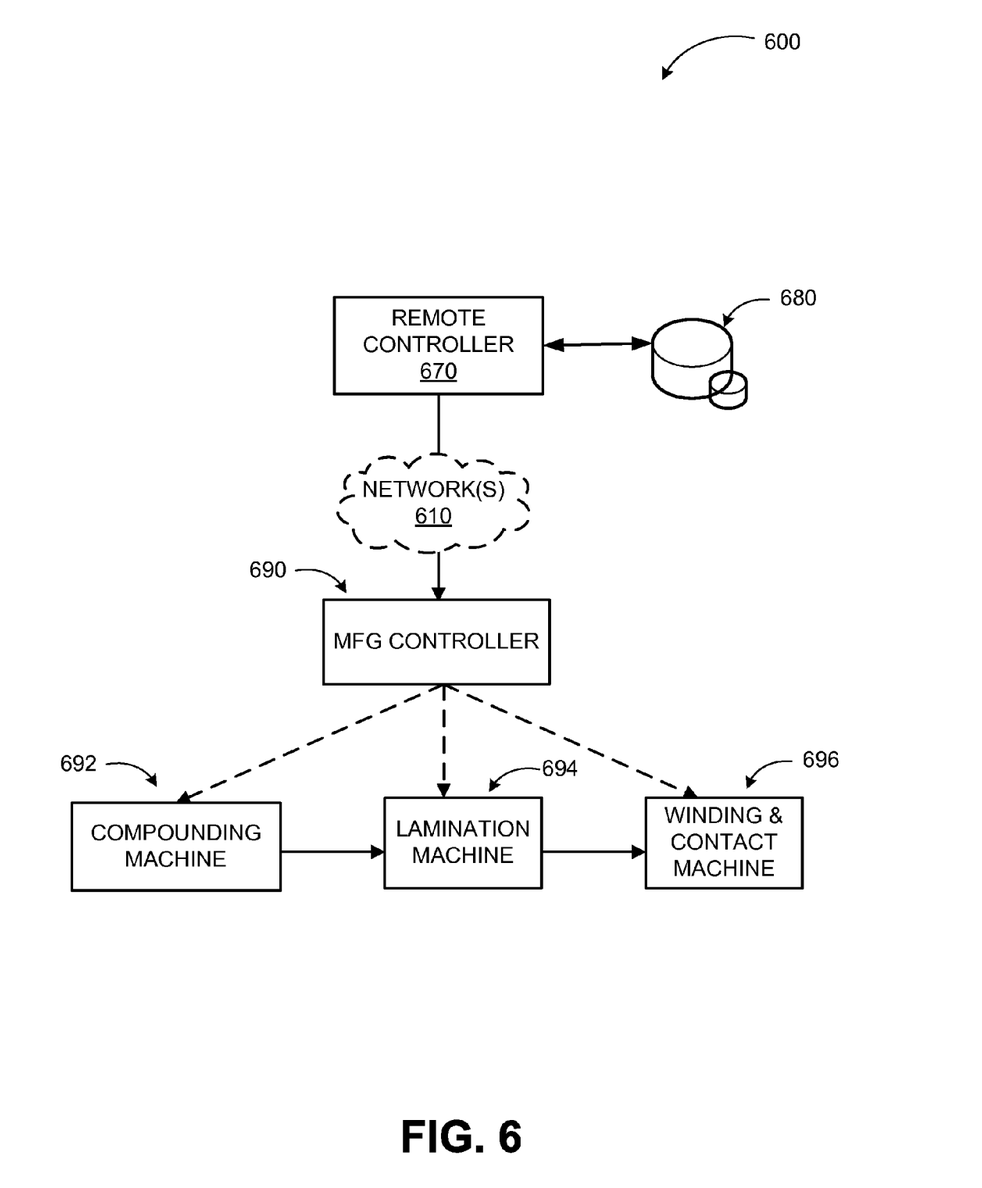
FIG. 6 is a block diagram of an automated machine that may be used for making an example electron conductive polymer capacitor using the process steps outlined in FIG. 5.
Figure 7:
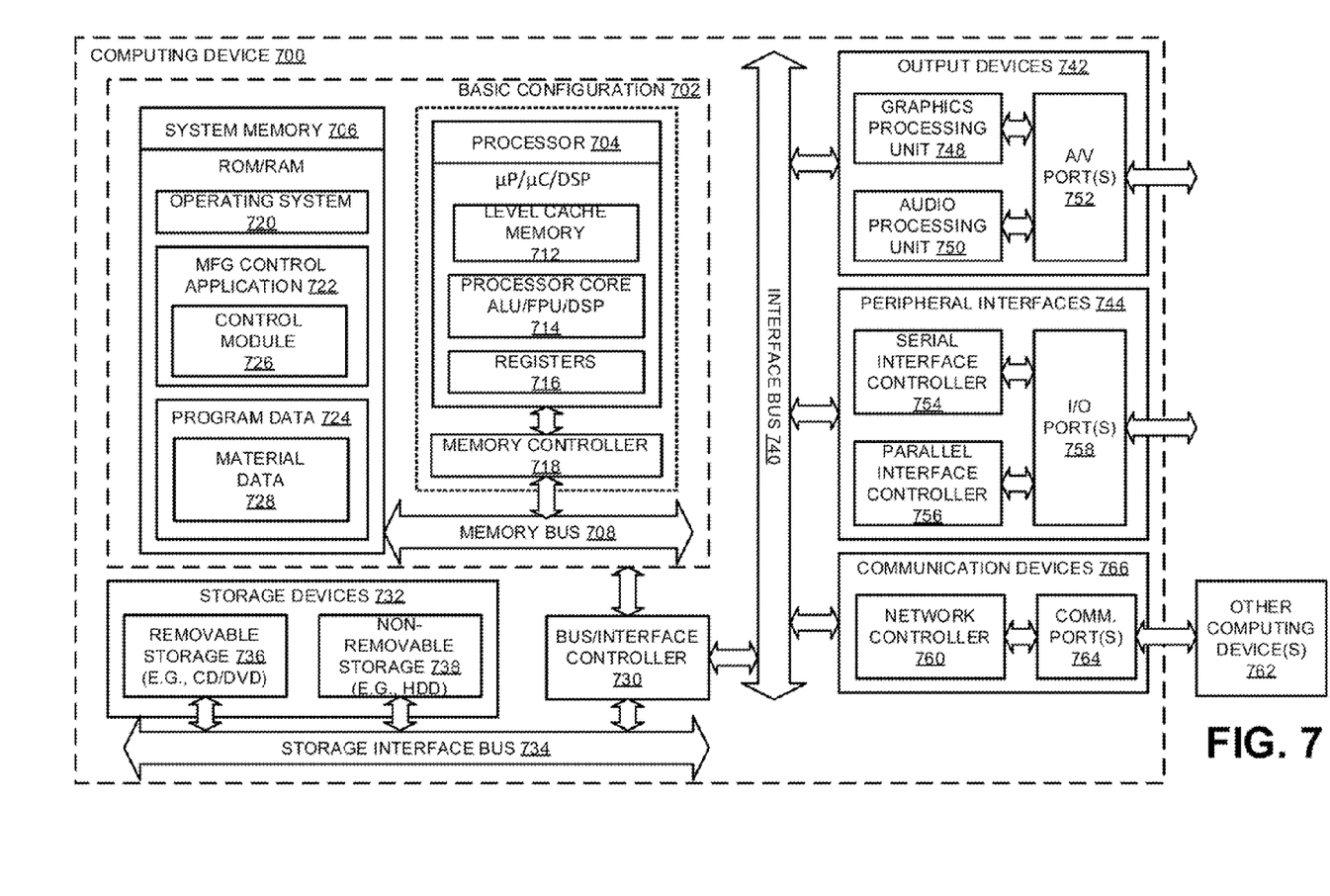
FIG. 7 illustrates a general purpose computing device that may be used to control the automated machine of FIG. 6 or similar manufacturing equipment in making an example electron conductive polymer capacitor as disclosed herein.

In particular, FIG. 5 illustrates an example method of making an electron conductive polymer capacitor that may be controlled by a computing device such as device 700 in FIG. 7 or a special purpose controller such as manufacturing controller 690 of FIG. 6. Thus, controller device 510 may be embodied as computing device 700, manufacturing controller 690, or similar devices adapted to execute instructions stored in computer-readable medium 520 for controlling the performance of the method. A process of making electron conductive polymer capacitor may include one or more operations, functions or actions as is illustrated by one or more of blocks 522, 524, 526, and/or 528.

Some example processes may begin with operation 522, "COMPOUND ELECTROLYTE MATERIALS". Operation 522 may be performed, for example, by compounding machine 692 of FIG. 6. At operation 522, manufacturing controller 690 may be configured to instruct (e.g., via one or more control signals) compounding machine 692 according to one or more predetermined parameters for mixing the electrolyte mixture. An example parameter for mixing the electrolyte mixture may be the extent of mixing, either by elapsed time, or by some physical property, such as viscosity, temperature, or concentration of the ionic salt or salt mixtures being mixed. Operation 522 may be continued until the predetermined parameter for mixing the electrolyte mixture has been achieved, e.g. the mixing has proceeded for a sufficient length of time to achieve desired dispersal and concentration of the ionic salts.

Operation 522 may be followed by operation 524, "COMPOUND CONDUCTIVE POLYMER AND CNP/CP MIXTURE". Operation 524 may be performed, for example, by compounding machine 692 of FIG. 6. At operation 524, manufacturing controller 690 may be configured to instruct (e.g., via one or more control signals) compounding machine 692 with predetermined parameters for mixing the conductive polymer mixtures, for example, the extent of mixing, either by elapsed time, or by some physical property, such as viscosity, temperature, or homogeneity of the polymer(s) and carbon-nanoparticles being embedded. Operation 524 may be continued until the predetermined parameter for mixing the conductive polymer mixtures has been achieved, e.g., the mixing has proceeded for a sufficient length of time to achieve desired dispersal of the carbon nanoparticles into the conductive polymer.

Operation 524 may be followed by optional operation 526, "LAMINATE ELECTRODES WITH ELECTROLYTE, CONDUCTIVE POLYMER, AND CNP/CP LAYERS". Operation 526 may be performed, for example, by lamination machine 694 of FIG. 6. At operation 526, manufacturing controller 690 may be configured to instruct (e.g., via one or more control signals) lamination machine 694 to assemble the laminate sheet using a doctor blading technique and a roller method with parameters such as thickness and baking temperature. Operation 526 may direct laminating machine 694 to coat each mixture onto a surface by a doctor blading procedure and to calendaring the electrodes to the laminate film using a roll-to-roll process. Operation 526 may also direct laminating machine 694 to extend tabs of the surface of the two inner electrodes beyond the edges of the laminate film for subsequent coupling.

Operation 526 may be followed by operation 528, "WIND AND CONTACT LAMINATED ELECTRODES FORMING CAPACITOR". Operation 528 may be performed, for example, by winding and contact machine 696 of FIG. 6. At operation 528, manufacturing controller 690 may be configured to instruct (e.g., via one or more control signals) winding and contact machine 696 to assemble the cylindrical capacitor by winding the completed laminate sheet into a cylindrical roll. At operation 528, manufacturing controller 690 may be adapted to instruct (e.g., via one or more control signals) winding and contact machine 696 to bring the electrodes into contact, by winding the laminate sheet into a roll resulting in contact between the outer electrodes during each successive wind, and bringing the extended tabs of the inner electrodes into contact for electrical coupling of the inner electrodes.

The operations included in the process of FIG. 5 described above are for illustration purposes. A process of making an example electron conductive polymer capacitor may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

FIG. 6 is a block diagram of an automated machine 600 that may be used for making an example electron conductive polymer capacitor using the process steps outlined in FIG. 5, in accordance with at least some embodiments described herein. As illustrated in FIG. 6, a manufacturing controller 690 may be coupled to machines that can be configured to carry out the steps described in FIG. 5, for example, via one or more of a compounding machine 692, a laminate machine 694, and/or a winding and contact machine 696. Manufacturing controller 690 may be operated by human control, or may be directed by a remote controller 670 via network 610. Data associated with controlling the different processes of making the electron conductive polymer capacitor may be stored at and/or received from data stores 680.

Following are example methods of making electron conductive polymer capacitor, using the machines and steps described above for FIGS. 5 and 6. In an example embodiment, compounding machine 692 may compound mixtures for layering within the laminate sheet capacitor. The compounding machine 692 may be configured to compound an electrolyte mixture including one or more ionic salt or salt mixtures, an ionically conducting polymer having a molecular weight in the range from about $10^5$ to about $10^7$, and propylene carbonate. The compounding machine 692 may approximately maximize the charging capacity of the capacitor by matching the concentration of the ionic salt or salts in the electrolyte mixture with the maximum potential electric charge contained in the conductive polymer mixture. The compounding machine 692 may be configured to compound a conductive polymer mixture of a structure allowing for ionization of atoms such that electrons will be made mobile in an applied electric field. The compounding machine may be configured to compound the conductive polymer layer from polymers or mixtures of polymers in the class of polythiophenes, polypyrroles, polypyridines, polycarbazoles, polyindoles, polyazepines, and polyphenylene sulfide. The compounding machine 692 may also be configured to compound a composite mixture by embedding carbon-nanoparticles into a portion of the conductive polymer mixture to create a carbon nanoparticles-conductive polymer mixture where the carbon-nanoparticles are dispersed throughout the matrix of the conductive polymer. The compounding machine may be configured to compound the various mixtures in an aprotic solvent to a viscosity in a range from about 50 to about 500 centipoise.

FIG. 7 illustrates a general purpose computing device that may be used to control the automated machine of FIG. 6 or similar manufacturing equipment in making an example electron conductive polymer capacitor, in accordance with at least some embodiments described herein. In a basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (pP), a microcontroller (pC), a digital signal processor (DSP), or any combination thereof. Processor 704 may include one more levels of caching, such as a level cache memory 712, a processor core 714, and registers 716. Example processor core 714 may include an arithmetic logic unit (ALU), a floating point unit (FPU), a digital signal processing core (DSP Core), or any combination thereof. An example memory controller 718 may also be used with processor 704, or in some implementations memory controller 715 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more manufacturing control application 722, and program data 724. Manufacturing control application 722 may include a control module 726 that is arranged to control automated machine 600 of FIG. 6 and any other processes, methods and functions as discussed above. Program data 724 may include, among other data, material data 728 for controlling various aspects of the automated machine 600. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 766) to basic configuration 702 via bus/interface controller 730. Example output devices 742 include a graphics processing unit 748 and an audio processing unit 750, which may be configured to communicate to various external devices such as a display or speakers via one or more NV ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 766 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a physical server, virtual server, a computing cloud, or a hybrid device that include any of the above functions. Computing device 700 may also be implemented as a personal computer including both laptop computer and non-laptop computer configurations. Moreover computing device 700 may be implemented as a networked system or as part of a general purpose or specialized server.

Networks for a networked system including computing device 700 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 702.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

The present disclosure generally describes a double layer electrochemical capacitor. An example double layer electrochemical capacitor may include two inner electrodes and two outer electrodes, where an electrolyte mixture is deposited between the outer and inner electrodes. The example electrochemical capacitor may also include a conductive polymer layer deposited between the inner electrodes, where electrons are mobile when an electric field is applied between each of the outer and inner electrodes. The electrochemical capacitor my further include a composite material of carbon nanoparticles embedded in the conductive polymer layer, where the composite material is deposited along the inside surfaces of each of the inner electrodes between the inner electrode and the conductive polymer layer.

According to some examples, the two inner electrodes may be electrically coupled together and the two outer electrodes may be electrically coupled together. The inner and outer electrodes may be composed of Aluminum. The inner and outer electrodes may have a thickness varying in range from about 10 microns to about 50 microns.

According to other examples, the inner and outer electrodes may be biased when the capacitor is being charged such that the outer electrodes may be negatively charged and the inner electrodes may be positively charged. The inner and outer electrodes may be textured with pores varying in size from about 1 nanometer to about 999 nanometers in order to increase the electrode surface area. According to further examples, the electrolyte mixture layer may have a thickness varying in a range from about 1 micron to about 100 microns. The electrolyte mixture may include an ionically conducting polymer, a propylene carbonate, and one of an ionic salt or an ionic mixture.

According to yet other examples, the ionically conducting polymer may include polyethylene oxide having a molecular weight in a range from about $10^5$ to about $10^7$. The ionic salt or the ionic mixture may include at least one cation from the group of $Li^+$, $Na^+$, $NH_4$, and $NR_4^+$, where R represents a hydrocarbon, and at least one anion from the group of: $ClO_4^-$, $RSO_3^-$, and $BF_4^-$, where R represents a hydrocarbon. In various examples, the concentration of the ionic salt or ionic mixture in the electrolyte mixture may be matched to a maximum electron charge in the conductive polymer layer to achieve maximum charge storage capacity.

In further examples, the conductive polymer layer may have a thickness varying in a range from about 1 micron to about 100 microns. Conductive polymer layer may include one or more polymers from the group of: polyanilines, polythiophenes, polypyrroles, polypyridines, polycarbazoles, polyindoles, polyazepines, and/or polyphenylene sulfide. The carbon nanoparticles may have an average diameter in a range from about 10 to about 100 nanometers.

The present disclosure also describes methods for constructing electrochemical capacitors. In some examples, a method of constructing an electrochemical capacitor may include compounding an electrolyte mixture of an ionically conducting polymer, a propylene carbonate, and one of an ionic salt or ionic mixture. The method of constructing the electrochemical capacitor may also include compounding a conductive polymer and compounding carbon nanoparticles with a portion of the conductive polymer to create a carbon nanoparticle-conductive polymer (CNP/CP) layer. The method of constructing the electrochemical capacitor may further include creating a laminate sheet, where the laminate sheet is made up of two inner and two outer electrodes, the electrolyte mixture, the conductive polymer mixture, and the CNP/CP layer. The method of constructing the electrochemical capacitor may further include winding the laminate sheet into a roll and coupling the inner electrodes together electrically and the outer electrodes together electrically.

According to other examples, the method for constructing the electrochemical capacitor may include forming one or more extended tabs of the inner electrodes beyond an edge of the roll, and coupling the inner electrodes by attaching the tabs onto an inner surface of the roll. The method for constructing the electrochemical capacitor may also include compounding the electrolyte mixture by mixing an ionically conducting polymer, a propylene carbonate, and one of an ionic salt or ionic mixture in an aprotic solvent to a viscosity in a range from about 50 to about 500 centipoise. The method may further include using an aprotic solvent that consists of either gamma-butyrolactone or cyclopentanone.

According to further examples the ionic salt or ionic mixture may include at least one cation from the group of $Li^+$, $Na^+$, $NH_4$, and $NR_4^+$, where R represents a hydrocarbon, and at least one anion from the group of: $ClO_4^-$, $RSO_3^-$, and $BF_4^-$, where R represents a hydrocarbon. The method may also include matching a concentration of the ionic salt or ionic mixture in the electrolyte mixture to a maximum electron charge in the conductive polymer layer to achieve maximum charge storage capacity.

According to yet other examples, the method for constructing the electrochemical capacitor may include compounding the conductive polymer materials by mixing one or more polymers from the group of: polyanilines, polythiophenes, polypyrroles, polypyridines, polycarbazoles, polyindoles, polyazepines, and polyphenylene sulfide together in an aprotic solvent to a viscosity in a range from about 50 to about 500 centipoise. The electrolyte mixture layer may have a thickness varying in a range from about 1 micron to about 100 microns.

According to some examples, the method may include forming the CNP/CP layer with carbon nanoparticles have an average diameter in a range from about 10 to about 100 nanometers and/or depositing the conductive polymer layer with a thickness varying in range from about 1 micron to about 100 microns. The inner and outer electrodes may be textured with pores varying in size from about 1 nanometer to about 999 nanometers in order to increase a surface area.

The method for constructing the electrochemical capacitor may further include spreading a first of the outer electrodes onto a roller, spreading a layer of the electrolyte mixture onto a surface of the first outer electrode using a doctor blading procedure, spreading a first of the inner layer electrodes onto a roller, calendering the first inner electrode with the electrolyte mixture coated first outer electrode to join, creating a thin laminate film with an electrolyte center layer and electrode outer layers, and baking the thin laminate film. A layer of the CNP/CP mixture may be spread onto a surface of the first inner electrode using a doctor blading procedure, the thin laminate film heated, a layer of the conductive polymer mixture spread onto a surface of the CNP/CP layer, and the first inner electrode coated using a doctor blading procedure. Furthermore, the thin laminate film may be heated, a layer of the CNP/CP mixture spread onto a surface of the conductive polymer mixture using a doctor blading procedure, a second inner electrode calendered to the CNP/CP layer of the thin laminate film, the thin laminate film heated, and a layer of the electrolyte mixture spread onto a surface of the second inner electrode using a doctor blading procedure.

According to further examples, the method for constructing the electrochemical capacitor may include calendering a second outer electrode with the electrolyte coated second inner electrode to join, creating a second thin laminate film with the first outer electrode, the electrolyte mixture layer, the first inner electrode, the CNP/CP layer, the inner conductive polymer layer, a second carbon CNP/CP layer, the second inner electrode, a second electrolyte mixture layer, and the second outer electrode, and baking the second thin laminate film.

The present disclosure further describes a method for rapidly charging an electrochemical capacitor. The method for rapidly charging the electrochemical capacitor may include applying a direct current bias to the two sets of inner and outer electrodes, where the electrically coupled outer electrodes are negatively charged and the electrically coupled inner electrodes are positively charged. The method for rapidly charging the electrochemical capacitor may also include, through an electrical field created by the applied direct current bias, causing cations within the electrolyte mixture deposited between the outer electrodes and the inner electrodes to move toward the outer electrodes and anions within the electrolyte mixture to move toward the inner electrodes. The method for rapidly charging the electrochemical capacitor may further include ionizing or oxidizing the inner conductive polymer layer deposited between the inner electrodes, and causing electrons within the conductive polymer to drift toward the inner electrodes.

According to some examples, the method may include causing the electrons en-route to the inner electrodes to be deposited onto surfaces of carbon nanoparticles embedded into a portion of the conductive polymer layer along a surface of the inner electrodes. The carbon nanoparticles may have an average diameter in a range from about 10 to about 100 nanometers. The method may also include removing the direct current bias such that the electrons remain on the carbon nanoparticles as stored energy. The electrolyte mixture may include an ionically conducting polymer, a propylene carbonate, and one of an ionic salt or ionic mixture.

According to some examples the ionic salt or ionic mixture may include at least one cation from the group of $Li^+$, $Na^+$, $NH_4$, and $NR_4^+$, where R represents a hydrocarbon, and at least one anion from the group of: $ClO_4^-$, $RSO_3^-$, and $BF_4^-$, where R represents a hydrocarbon. A concentration of the ionic salt or ionic mixture in the electrolyte mixture may be matched to a maximum electron charge in the conductive polymer layer to achieve maximum charge storage capacity. The conductive polymer layer may include one or more polymers from the group of: polyanilines, polythiophenes, polypyrroles, polypyridines, polycarbazoles, polyindoles, polyazepines, and polyphenylene sulfide.

The terms "a" and "an" as used herein mean "one or more" unless the singular is expressly specified. Thus, for example, reference to "a base" includes a mixture of two or more bases, as well as a single base.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to, plus or minus 10% of the particular term.

The terms "optional" and "optionally" mean that the subsequently described circumstance may or may not occur, so that the description includes instances where the circumstance occurs and instances where it does not.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical manufacturing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electrochemical capacitor, comprising:
   two outer electrodes;
   two inner electrodes;
   an electrolyte mixture that includes an ionically conducting polymer, a propylene carbonate, and one of an ionic salt or an ionic mixture, wherein the electrolyte mixture is disposed between the outer electrodes and the inner electrodes, and wherein a concentration of the ionic salt or the ionic mixture is matched to a maximum electron charge in a conductive polymer layer to achieve maximum charge storage capacity;
   the conductive polymer layer deposited between the two inner electrodes and configured such that electrons are mobile when an electric field is applied between each of the outer and inner electrodes; and
   a composite material of carbon nanoparticles embedded in the conductive polymer layer wherein the composite materials deposited along an inside surface of the inner electrodes between the inner electrode and the conductive polymer layer.

2. The electrochemical capacitor of claim 1, wherein the two inner electrodes are electrically coupled together and the two outer electrodes are electrically coupled together.

3. The electrochemical capacitor of claim 1, the inner electrodes and the outer electrodes comprise aluminum.

4. The electrochemical capacitor of claim 1, wherein the inner and outer electrodes have a thickness varying in a range from about 10 microns to about 50 microns.

5. The electrochemical capacitor of claim 1, wherein the inner electrodes and the outer electrodes are biased when the capacitor is being charged such that the outer electrodes are negatively charged and the inner electrodes are positively charged.

6. The electrochemical capacitor of claim 1, wherein the inner electrodes and the outer electrodes are textured with pores varying in size from about 1 nanometer to about 999 nanometers in order to increase a surface area.

7. The electrochemical capacitor of claim 1, wherein the electrolyte mixture has a thickness varying in a range from about 1 micron to about 100 microns.

8. The electrochemical capacitor of claim 1, the ionically conducting polymer comprising polyethylene oxide having a molecular weight in a range from about $10^5$ to about $10^7$.

9. The electrochemical capacitor of claim 1, wherein the ionic salt or the ionic mixture comprise at least one cation that includes $Li^+$, $Na^+$, $NH_4$, and $NR_4^+$, where R represents a hydrocarbon, and at least one anion that includes $ClO_4^-$, $RSO_3^-$, and $BF_4^-$, where R represents a hydrocarbon.

10. The electrochemical capacitor of claim 1, wherein the conductive polymer layer has a thickness varying in a range from about 1 micron to about 100 microns.

11. The electrochemical capacitor of claim 1, wherein the conductive polymer layer includes one or more polymers that include polyanilines, polythiophenes, polypyrroles, polypyridines, polycarbazoles, polyindoles, polyazepines, and polyphenylene sulfide.

12. The electrochemical capacitor of claim 1, wherein the carbon nanoparticles have an average diameter in a range from about 10 to about 100 nanometers.

* * * * *